United States Patent [19]

Rowe et al.

[11] Patent Number: 5,445,743
[45] Date of Patent: Aug. 29, 1995

[54] METHACRYLATE POLYMERS AS ANTIFOULANTS IN QUENCH WATER SYSTEMS

[75] Inventors: Carl T. Rowe, Missouri City; Sherri L. Fisher, Sugar Land, both of Tex.

[73] Assignee: Nalco Chemical Company, Naperville, Ill.

[21] Appl. No.: 194,768

[22] Filed: Feb. 10, 1994

[51] Int. Cl.$^6$ .............................................. C02F 5/10
[52] U.S. Cl. ................................. 210/701; 252/341; 585/950
[58] Field of Search ........................ 203/6, 8, 9; 210/698–701, 708; 524/55; 585/950; 252/341, 358

[56] References Cited

U.S. PATENT DOCUMENTS

| | | | |
|---|---|---|---|
| 2,737,452 | 3/1956 | Catlin | 44/62 |
| 3,231,458 | 1/1966 | Lawson | 161/162 |
| 3,531,440 | 9/1970 | Mehmedbasich et al. | 260/78.4 |
| 3,554,897 | 1/1971 | Stanley | 208/48 |
| 3,560,456 | 2/1971 | Hazen et al. | 260/78.5 |
| 3,964,176 | 9/1972 | Miller | 44/62 |
| 4,105,540 | 8/1978 | Weinland | 203/6 |
| 4,151,069 | 4/1979 | Rossi | 208/33 |
| 4,240,916 | 12/1980 | Rossi | 252/568 |
| 4,548,725 | 10/1985 | Bridger | 252/56 R |
| 4,780,499 | 10/1988 | Villarreal et al. | 524/259 |
| 4,866,135 | 9/1989 | Gulierrez et al. | 525/285 |
| 4,919,683 | 4/1990 | Nalesnik et al. | 144/347 |
| 5,221,461 | 6/1993 | Henrici et al. | 252/404 |
| 5,232,963 | 8/1993 | Comer et al. | 524/55 |
| 5,294,347 | 3/1994 | Byrne et al. | 210/708 |

*Primary Examiner*—Peter A. Hruskoci
*Attorney, Agent, or Firm*—Robert A. Miller; James J. Drake

[57] ABSTRACT

A method for dispersing high molecular weight hydrocarbon material in an ethylene water quench tower, the method comprising the step of: introducing a deposit inhibiting amount of a dispersant into the ethylene water quench tower, the dispersant comprising a copolymer of a first monomer and a second monomer, the first monomer being selected from the group consisting of butyl methacrylate, lauryl methacrylate, stearyl methacrylate, and decyl methacrylate-2-ethylhexyl methacrylate, the second monomer being selected from the group consisting of diethyl-aminoethyl methacrylate, dimethyl amino-ethyl methacrylate, phenyl aminoethyl methacrylate, butyl aminoethyl methacrylate, and propyl aminoethyl methacrylate.

2 Claims, No Drawings

METHACRYLATE POLYMERS AS ANTIFOULANTS IN QUENCH WATER SYSTEMS

BACKGROUND OF THE INVENTION

1. Field of the Invention

The present invention relates to dispersing high molecular weight hydrocarbon materials present in an ethylene water quench tower with methacrylate containing polymers.

2. Description of the Prior Art

In ethylene manufacturing plants, cracked gases are quenched with water in the quench tower. The gas is quenched to condense steam and heavy hydrocarbons, cool the gases prior to compression, and stop unwanted polymerization reactions. The hydrocarbons can deposit and adhere to the trays, packing, interior of quench system coolers, other tower internals, and the oil/water separator. This is referred to as fouling.

Fouling may occur by deposition of corrosion products and by the formation of polymeric material. Polymers can result from the reaction of organic compounds in the pyrolysis gasoline with oxygen. Fouling will result in reduction of heat removed from the process. Fouling can lead to plugging of trays or packing, resulting in reduced liquid-gas contact, increased top temperature and pressure differential, and finally in flooding of the tower. An increased top temperature of the quench water tower will result in a larger volume of cracked gas to compress. This may act to restrict the throughput, but in any case, it increases the energy consumption by the cracked gas compressors.

SUMMARY OF THE INVENTION

A method for dispersing high molecular weight hydrocarbon material in an ethylene water quench tower, the method comprising the step of: introducing a deposit inhibiting amount of a dispersant into the ethylene water quench tower, the dispersant comprising a copolymer of a first monomer and a second monomer, the first monomer being selected from the group consisting of butyl methacrylate, lauryl methacrylate, stearyl methacrylate, and decyl methacrylate-2-ethylhexyl methacrylate, the second monomer being selected from the group consisting of diethyl-aminoethyl methacrylate, dimethyl amino-ethyl methacrylate, phenyl aminoethyl methacrylate, butyl aminoethyl methacrylate, and propyl aminoethyl methacrylate.

DESCRIPTION OF THE PREFERRED EMBODIMENTS

In accordance with this invention, there is provided a method for dispersing heavy hydrocarbon in an ethylene water quench tower. The invention prevents the formation of deposits thereon with an additive which inhibits or substantially prevents the formation of deposits in the treated stream and thereby prevents fouling of the process equipment.

The material which has been found effective for this purpose is an oil-soluble basic amino-nitrogen-containing addition-type polymer of a plurality of polymerizable ethylenically unsaturated compounds. At least one of these ethylenically unsaturated compounds is amine-free and contains from 4 to about 18 carbon atoms in a predominantly straight chain aliphatic hydrocarbon group which, in the polymer, is not part of the main polymer chain. At least one of the other ethylenically unsaturated compounds contains an amino nitrogen group which exists in the polymer as a basic amino nitrogen in the side chain. Said polymer contains from about 0.1 to 3.5 percent by weight of basic amino nitrogen.

The methacrylate esters are particularly suitable as both the amine-free ethylenically unsaturated component and the; basic amino nitrogen containing component of the copolymer. Examples of the first class of esters are butyl methacrylate, lauryl methacrylate, stearyl methacrylate, decyl methacrylate-2-ethylhexyl methacrylate and mixtures of these methacrylate esters. Examples of the nitrogen-containing ethylenically unsaturated compounds include diethylaminoethyl methacrylate, dimethyl amino-ethyl methacrylate, phenyl aminoethyl methacrylate, butyl aminoethyl methacrylate, and propyl aminoethyl methacrylate and the like.

Copolymers useful in the practice of the invention can be prepared by conventional bulk, solution or dispersant polymerization methods using known catalysts, such as benzoyl peroxide and azo compounds, such as alpha, alpha-azodiisobutyronitrile. Convenient solvents for the polymerization are high-boiling hydrocarbons, particularly those similar to the hydrocarbons in which the copolymers are to be used, such as kerosene. These polymerization processes are described in U.S. Pat. No. 3,554,897, the disclosure of which is incorporated herein by reference.

Oil-soluble basic amino nitrogen-containing copolymer meeting the above description can be prepared from the copolymerization of n-octyl methacrylate with diethylaminoethyl methacrylate, lauryl methacrylate with diethylaminoethyl methacrylate, lauryl methacrylate with phenyl aminomethyl methacrylate, tridecyl methacrylate with diethylaminoethyl methacrylate and the like. The method of preparing the addition polymer useful in the process of the invention is set forth in U.S. Pat. No. 2,737,452.

The process of this invention involves adding a minor amount of the oil soluble, basic amino nitrogen-containing addition type copolymer to the quench water return stream being processed, the amount being effective to inhibit the formation and laydown of deposits in the process equipment, including the quench tower and oil/water separator. Depending on the nature of the stream being processed, an effective deposit inhibiting amount of the additive will range from about 0.5 to about 1,000 parts per million. The preferred amount of the additive will generally be from about 2 to about 50 parts per million of the additive. Most preferably, the deposit inhibiting amount will be from about 5 to about 25 parts per million. The invention will maintain throughput while increasing run length.

The following examples are presented to describe preferred embodiments and utilities of the invention and are not meant to limit the invention unless otherwise: stated in the claims appended hereto.

EXAMPLE 1

The invention would work as follows: The copolymer antifoulant suitable for use in the present invention would normally be added to the tower via the quench water return at a concentration of from about 0.5 to 1,000 parts per million, and more preferably from 1 to 25 parts per million. Emulsified water can lead to polymeric fouling and deposition. The present invention would prevent the emulsified oil, free oil, and oil-bound particulates from adhering from the tower internals and various heat exchangers. The invention would keep the oil(s) dispersed until such time in the system that the oil can separate from the water, usually in the oil/water separator. This invention offers the significant advantage of not contributing to or forming emulsions in the water.

Changes can be made in the composition, operation and arrangement of the method of the present invention described herein without departing from the concept and scope of the invention as defined in the following claims:

We claim:

1. A method for dispersing polymeric foulants in a quench water used to quench cracked gases in an ethylene water quench tower, the method comprising the step of: introducing a deposit inhibiting amount of an oil-soluble dispersant into said quench water, the dispersant comprising a copolymer of a first monomer and a second monomer, the first monomer being selected from the group consisting of butyl methacrylate, lauryl methacrylate, stearyl methacrylate, and decyl methacrylate-2-ethylhexyl methacrylate, the second monomer being selected from the group consisting of diethylaminoethyl methacrylate, dimethylaminoethyl methacrylate, phenyl aminoethyl methacrylate, butyl aminoethyl methacrylate, and propyl aminoethyl methacrylate wherein said polymer contains from about 0.1% to 3.5% by weight of basic amino nitrogen, to disperse said polymeric foulants and prevent deposition of said polymeric foulants in said quench tower.

2. The method of claim 1 wherein the deposit inhibiting amount of the dispersant is from about 0.5 to about 1,000 parts per million.

* * * * *